(12) United States Patent
Saruwatari et al.

(10) Patent No.: US 11,374,471 B2
(45) Date of Patent: Jun. 28, 2022

(54) METHOD OF MANUFACTURING CORE PRODUCT

(71) Applicant: Mitsui High-tec, Inc., Kitakyushu (JP)

(72) Inventors: Shigeru Saruwatari, Kitakyushu (JP); Masayuki Ono, Kitakyushu (JP)

( * ) Notice: Subject to any disclaimer, the term of this patent is extended or adjusted under 35 U.S.C. 154(b) by 377 days.

(21) Appl. No.: 16/197,218

(22) Filed: Nov. 20, 2018

(65) Prior Publication Data

US 2019/0157952 A1 May 23, 2019

(30) Foreign Application Priority Data

Nov. 22, 2017 (JP) .............................. JP2017-224935

(51) Int. Cl.
*H02K 15/03* (2006.01)
*B29C 45/14* (2006.01)
(Continued)

(52) U.S. Cl.
CPC ............. *H02K 15/03* (2013.01); *B29B 13/02* (2013.01); *B29B 13/022* (2013.01);
(Continued)

(58) Field of Classification Search
CPC .......... H02K 15/03; H02K 1/17; H02K 1/276; H02K 15/12; B29B 13/02; B29B 13/022;
(Continued)

(56) References Cited

U.S. PATENT DOCUMENTS

| 2003/0104743 A1 | 6/2003 | Weberg et al. |
| 2014/0327329 A1* | 11/2014 | Kitada ..................... C08L 63/04 310/43 |

(Continued)

FOREIGN PATENT DOCUMENTS

| CN | 102504490 | 6/2012 |
| CN | 102504743 | 6/2012 |

(Continued)

OTHER PUBLICATIONS

Kowalik "Handling Guide and Instructions: Z01UD Prepreg", Zoltek, 2012. (Year: 2012).*

(Continued)

*Primary Examiner* — Matthew J Daniels
*Assistant Examiner* — Gregory C. Grosso
(74) *Attorney, Agent, or Firm* — Soei Patent & Law Firm (57) ABSTRACT

A method of manufacturing an core product includes heating the resin pellet at a temperature higher than 25° C. for 24 hours or longer, the resin pellet being formed of a thermosetting resin composition including epoxy resin, a curing agent, accelerator, and a release agent. The method includes holding a core body having a resin formation region, which is a region in which a resin is to be formed by injection of a melted resin, between a pair of holding members, and disposing the heated resin pellet in a resin pot formed in at least one of the pair of holding members. Additionally, the method includes melting the resin pellet in the resin pot and injecting the melted resin into the resin formation region through a resin channel extending from the resin pot in communication with the resin formation region, and curing the melted resin injected into the resin formation region.

19 Claims, 6 Drawing Sheets

(51) Int. Cl.
  *H02K 15/12* (2006.01)
  *B29B 13/02* (2006.01)
  *B29C 45/02* (2006.01)
  *B29B 13/06* (2006.01)
  *H02K 1/17* (2006.01)
  *H02K 1/276* (2022.01)
  *B29K 63/00* (2006.01)
  *B29K 105/00* (2006.01)
  *B29K 101/10* (2006.01)

(52) U.S. Cl.
  CPC ............ *B29B 13/065* (2013.01); *B29C 45/02* (2013.01); *B29C 45/14344* (2013.01); *H02K 1/17* (2013.01); *H02K 1/276* (2013.01); *H02K 15/12* (2013.01); *B29K 2063/00* (2013.01); *B29K 2101/10* (2013.01); *B29K 2105/251* (2013.01)

(58) Field of Classification Search
  CPC . B29B 13/065; B29C 45/02; B29C 45/14344; B29C 45/14639; B29C 70/72; B29C 41/30; B29C 43/18; B29C 2043/182; B29K 2063/00; B29K 2101/10; B29K 2105/251; B29K 2995/0008
  USPC .............................. 264/272.2, 272.19, 271.1
  See application file for complete search history.

(56) References Cited

U.S. PATENT DOCUMENTS

2016/0031135 A1* 2/2016 Hicks ................ B29C 45/14811
                                                            264/279
2016/0264717 A1* 9/2016 Pastine .............. C08G 59/1477
2017/0166717 A1* 6/2017 Odriozola ............... C08L 63/00

FOREIGN PATENT DOCUMENTS

| CN | 102977552 | 3/2013 |
|----|-----------|--------|
| JP | H3-000218 | 1/1991 |
| JP | 2000-007718 | 1/2000 |
| JP | 2008-054376 | 3/2008 |
| JP | 2015-039296 | 2/2015 |
| JP | 2015-074772 | 4/2015 |

OTHER PUBLICATIONS

Nasai, "Prepreg Formulation for Windsurf and Surfboard Manufacturing", Suranaree University of Technology, 2006, [p. 25, 30], (Year: 2006).*
Kiyohisa (JP2008054376A), with full document computer translation by J-PlatPat (Year: 2008).*
Fariezul Jaafar, "Fibre Reinforced Plastic: Storage and Handling of Prepregs", Mar. 15, 2010.
Ramakrishnan, "Shelf life for Plastics", May 15, 2008.
Anonymous, "Room temperature—Wikipedia", Nov. 18, 2017.
Extended Search Report in corresponding European Application No. 18207358.5, dated Mar. 19, 2019.
Anonymous et al, "What are the regulatory Definition for "Ambient", "Room Temperature" and "Cold Chain"?—ECA Academy", gmp-compliance.org, Retrieved from the Internet: URL:https://web.archive.org/web/20170310120135/https://www.gmp-compliance.org/gmp-news/what-are-the-regulatory-definitions-for-ambient-room-temperature-and-cold-chain, Mar. 10, 2017.

* cited by examiner

METHOD OF MANUFACTURING CORE PRODUCT

CROSS-REFERENCE TO RELATED APPLICATIONS

This application claims the benefit of priority from Japanese Patent Application No. 2017-224935, filed on Nov. 22, 2017, the entire contents of which are incorporated herein by reference.

FIELD

The present disclosure relates to a method of manufacturing an core product for a motor, such as a rotor core or a stator core.

BACKGROUND

Japanese Unexamined Patent Publication No. 2015-039296 discloses a rotor core including a core body having a plurality of magnet insertion holes at predetermined intervals around the rotation axis, each of the holes extending to pass through the core body in a height direction, permanent magnets disposed in the magnet insertion holes, and solidified resins filling the magnet insertion holes and being solidified therein.

SUMMARY

A method of manufacturing an core product includes heating the resin pellet, which was previously refrigerated, at a temperature higher than 25° C. for 24 hours or longer, the resin pellet being formed of a thermosetting resin composition including epoxy resin, a curing agent, accelerator, and a release agent. The method may include holding a core body having a resin formation region, which is a region in which a resin is to be formed by injection of a melted resin, between a pair of holding members, and disposing the heated resin pellet in a resin pot formed in at least one of the pair of holding members. Additionally, the method may include melting the resin pellet in the resin pot and injecting the melted resin into the resin formation region through a resin channel extending from the resin pot in communication with the resin formation region, and curing the melted resin injected into the resin formation region.

DETAILED DESCRIPTION

In the following description, with reference to the drawings, the same reference numbers are assigned to the same components or to similar components having the same function, and overlapping description is omitted.

Configuration of Heat Treatment Apparatus

Figure 1:
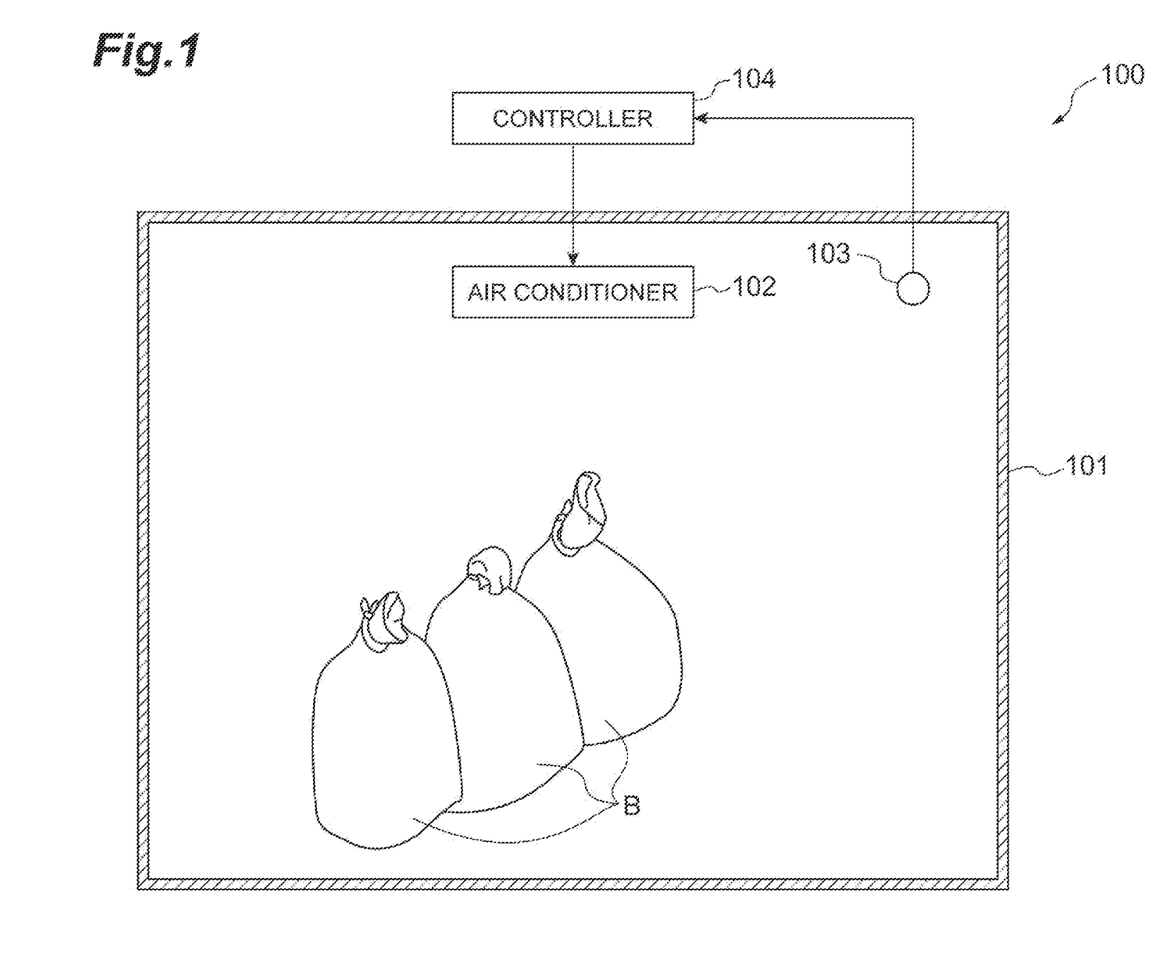
FIG. 1 is a schematic diagram illustrating an example heat treatment apparatus.
Figure 2:
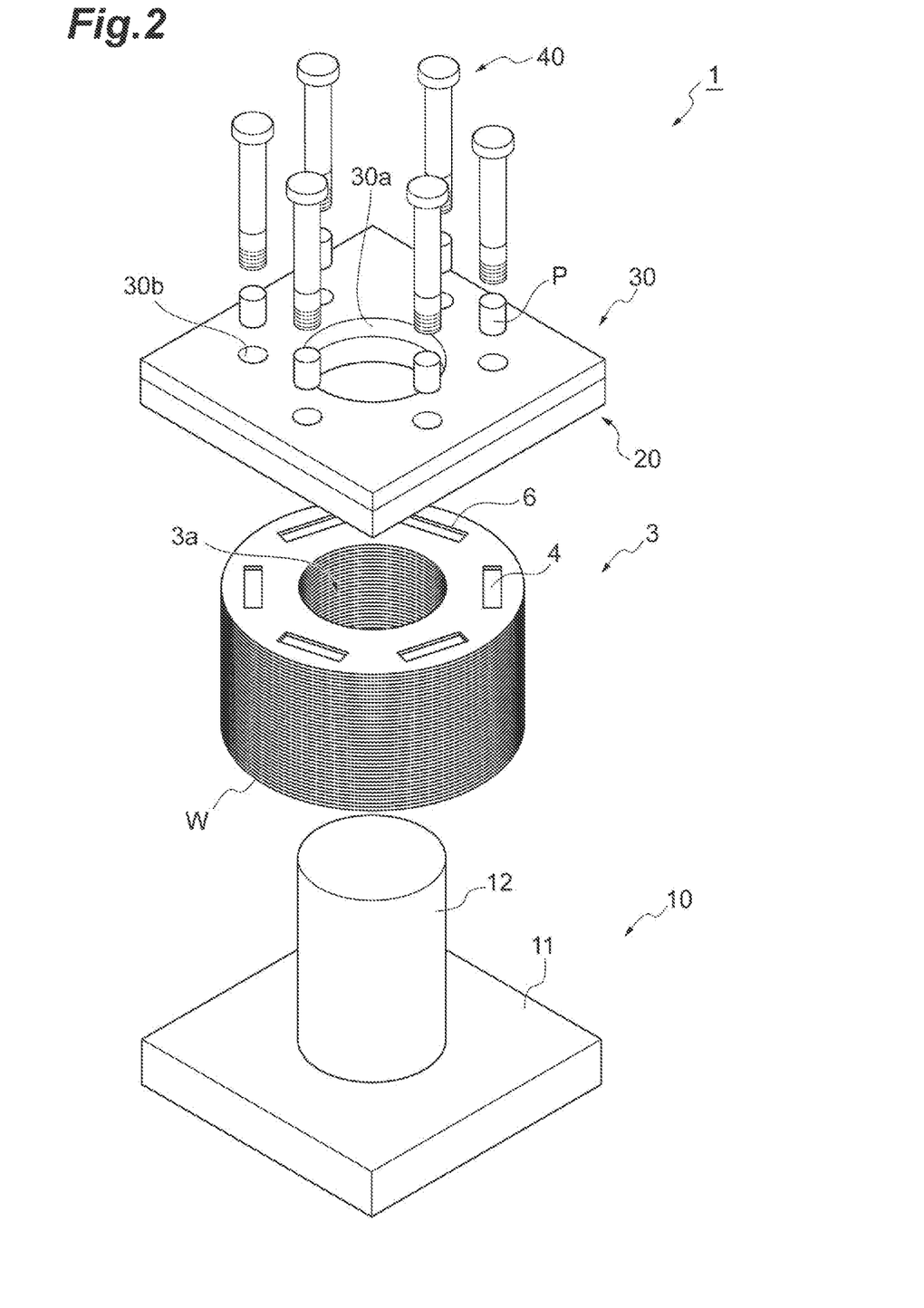
FIG. 2 is a perspective view of an example resin charging apparatus.
Figure 3:
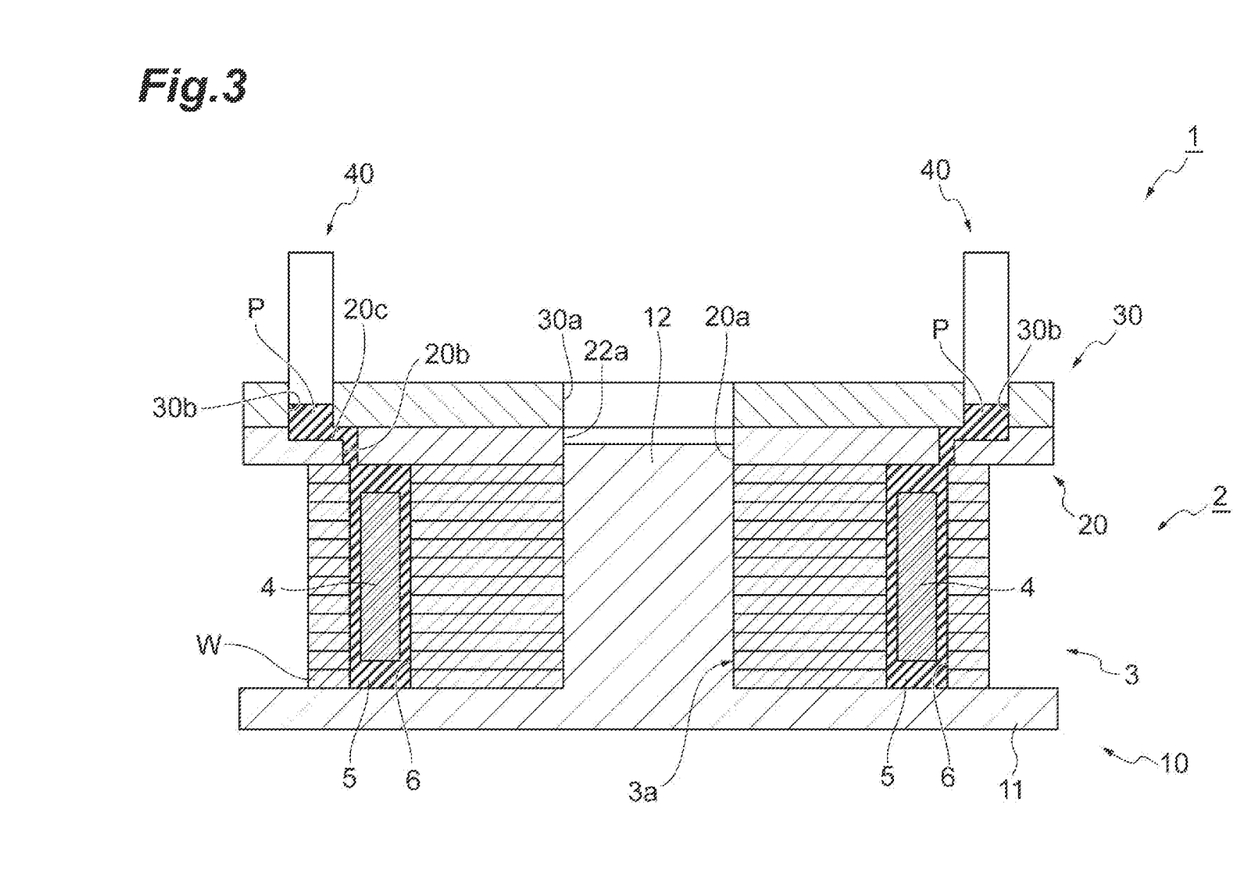
FIG. 3 is a cross-sectional view of the resin charging apparatus in FIG. 1.

An example heat treatment apparatus 100 illustrated in FIG. 1 has a function of heat-treating a resin pellet P (see FIG. 2 and FIG. 3). The resin pellet P is produced by forming a thermosetting resin composition into a predetermined size and shape. The resin pellet P may have, for example, a cylindrical shape of a few millimeters in diameter and height. The thermosetting resin composition forming the resin pellet P may be, for example, a mixture of epoxy resin, curing agent, accelerator, filler, release agent, and other additives. When the thermosetting resin composition is 100% by mass, the epoxy resin content may be equal to or less than 20% by mass, the curing agent content may be equal to or less than 10% by mass, the accelerator content may be equal to or less than 1% by mass, the filler content may be equal to or less than 70% by mass, and the release agent content may be equal to or less than 1%. Examples of other additives include fire retardant and stress reducer.

The heat treatment apparatus 100 includes a heat treatment chamber 101, an air conditioning apparatus 102, a temperature sensor 103, and a controller 104. The heat treatment chamber 101 is configured to store a predetermined amount of resin pellets P. As illustrated in FIG. 1, at least one bag B containing a plurality of resin pellets P may be stored in the heat treatment chamber 101. A drying agent may be attached to the inside or the outside of the bag B to reduce moisture absorbed by the resin pellets P in the bag B.

The air conditioning apparatus 102 is configured to operate based on an instruction signal from the controller 104 and to regulate the temperature in the heat treatment chamber 101. An example of the air conditioning apparatus 102 is a room-air conditioner. The temperature sensor 103 is configured to measure the temperature in the heat treatment chamber 101. The temperature sensor 103 transmits data of the measured temperature to the controller 104.

The controller 104 allows the air conditioning apparatus 102 to operate such that the temperature of the heat treatment chamber 101 approaches the setting temperature when the data of temperature received from the temperature sensor 103 is not in accord with the setting temperature. The inside of the heat treatment chamber 101 is thus always kept at the setting temperature. The setting temperature may be a temperature higher than room temperature (25° C.) or may be 28° C. to 32° C., or may be 29° C. to 31° C., or may be 30° C.

Configuration of Stacked Rotor Core and Resin Injection Apparatus

The resin injection apparatus 1 has a function of injecting melted resin into a predetermined resin formation region in a core body. The resin injection apparatus 1 may be used for manufacturing a stacked rotor core 2 (see FIG. 2).

Referring to FIG. 2 and FIG. 3, the example stacked rotor core 2 is described. The stacked rotor core 2 is part of a rotor. End plates and a shaft are attached to the stacked rotor core 2 to form a rotor. The rotor is combined with a stator to form an electric motor. The stacked rotor core 2 may be used for an interior permanent magnet (IPM) motor. The stacked rotor core 2 includes a stack 3 (core body), a plurality of permanent magnets 4, and a plurality of solidified resins 5.

The stack 3 has a cylindrical shape. That is, at the center of the stack 3, a shaft hole 3a passing through the stack 3 is provided so as to extend along the center axis. A shaft is inserted into the shaft hole 3a.

The stack 3 has a plurality of magnet insertion holes 6 (resin formation regions). As illustrated in FIG. 2, the magnet insertion holes 6 are arranged at predetermined intervals along the outer periphery of the stack 3. Each magnet insertion hole 6 passes through the stack 3 so as to extend along the shaft hole 3a.

The stack 3 is constructed such that a plurality of blanked member W are stacked. The blanked member W is a plate-like member formed by blanking an electromagnetic steel plate in a predetermined shape and has a shape corresponding to the stack 3. The stack 3 may be constructed by what is called rotational stacking. The "rotational stacking" refers to stacking a plurality of blanked members W such that the angles of the blanked members W are shifted relative to each other. The rotational stacking is performed mainly for the purpose of cancelling out the plate thickness deviation of the blanked members W. The angle of rotational stacking may be set to any given magnitude.

The blanked members W adjacent in the height direction (up-down direction) of the stack 3 may be fastened by swaged areas or may be bonded to each other using an adhesive or a resin material. Alternatively, temporary interlocking may be provided in blanked members W, and a plurality of blanked members W may be fastened through the temporary interlocking to produce a stack 3. The temporary interlocking may be thereafter removed from the stack. The term "temporary interlocking" may be understood to refer to an interlock that is used for temporarily integrating a plurality of blanked members W and that is removed in the process of manufacturing the product (stacked rotor core 2).

The permanent magnets 4 may be individually inserted into the magnet insertion holes 6, as illustrated in FIG. 2 and FIG. 3. The permanent magnet 4 may be formed in a variety of different shapes, for example, a rectangular parallelepiped shape. The kind of permanent magnet 4 that is selected for the rotor core 2 can be determined according to the applications of the motor, the required performance, and the like and may be, for example, sintered magnets or bonded magnets.

The solidified resin 5 is produced by charging a resin material in a melted state (melted resin) into the magnet insertion hole 6 having the permanent magnet 4, followed by solidifying the melted resin, as illustrated in FIG. 3. The solidified resin 5 has a function of fixing the permanent magnet 4 in the magnet insertion hole 6 and joining the blanked members W adjacent in the height direction of the stack 3.

Referring to FIG. 2 and FIG. 3, an example configuration of the resin injection apparatus 1 is described. The resin injection apparatus 1 includes a lower mold 10 (holding member), a resin guide member 20 (holding member), an upper mold 30 (holding member), and a plurality of plungers 40.

The lower mold 10 includes a base member 11 and an insertion post 12 provided on the base member 11. The base member 11 may comprise a plate-like member having a rectangular shape. The base member 11 is configured such that the stack 3 can be placed thereon. The insertion post 12 is positioned approximately at the center of the base member 11 and protrudes upward from the upper surface of the base member 11. The insertion post 12 has a cylindrical shape and has an outer shape corresponding to the shaft hole 3a of the stack 3.

The resin guide member 20 has a function of guiding the melted resin into a predetermined magnet insertion hole 6. The resin guide member 20 may be a plate-like member having a rectangular shape. As illustrated in FIG. 2 and FIG. 3, the resin guide member 20 has one through hole 20a, a plurality of through holes 20b (resin channels), and a plurality of runner grooves 20c (resin channels). The through hole 20a has a circular shape having approximately the same size as the outer diameter of the insertion post 12 and is disposed approximately at the center of the resin guide member 20.

A plurality of through holes 20b are disposed to annularly surround the through hole 20a. As illustrated in FIG. 2, each of a plurality of through holes 20b at least partially overlaps the corresponding magnet insertion hole 6 in communication therewith in a state in which the resin guide member 20 is placed on the stack 3. The through holes 20b thus function as gate holes used for injecting the melted resin into the magnet insertion holes 6.

A plurality of runner grooves 20c each extend along the surface of the resin guide member 20. Additionally, the plurality of runner grooves 20c each may extend radially along the radial direction of the through hole 20a. The inside end portion of each runner groove 20c is in communication with the corresponding through hole 20b. The through holes 20b and the runner grooves 20c thus function as resin injection channels for directing or guiding the melted resin into the magnet insertion holes 6.

The upper mold 30 is configured to hold the stack 3 with the lower mold 10 and the resin guide member 20 in the height direction thereof. The upper mold 30 may be a plate-like member having a rectangular shape. The upper mold 30 has one through hole 30a, a plurality of through holes 30b (resin pots), and an internal heat source (for example, a heater).

The through hole 30a has the same shape and size of the through hole 20a and is disposed approximately at the center of the upper mold 30. A plurality of through holes 30b are disposed to annularly surround the through hole 30a. As illustrated in FIG. 3, each of a plurality of through holes 30b at least partially overlaps the outside end portion of the runner groove 20c in a state in which the upper mold 30 is placed on the resin guide member 20. Each through hole 30b has a function of accommodating at least one resin pellet P. When the resin pellet P is heated by the internal heat source in the upper mold 30, the resin pellet P melts in the through hole 30b and changes into a melted resin.

A plurality of plungers 40 are positioned above the upper mold 30. Each plunger 40 is configured to be inserted into and/or removed from the corresponding through hole 30b by a drive source.

Method of Manufacturing Stacked Rotor Core

Referring to FIG. 1 to FIG. 3, an example method of manufacturing the stacked rotor core 2 is described.

First of all, resin pellets P are heat-treated. For example, a bag B is taken out of a refrigerator (cold container) and put into the heat treatment chamber 101 kept at 28° C. to 30° C. The bag B is left in the heat treatment chamber 101 for 24 hours or longer. The time for heat treatment of the resin pellets P (the standing time) may be equal to or longer than 24 hours, or may be equal to or longer than 48 hours, or may be 48 hours to 120 hours, or may be 48 hours to 96 hours, or may be 48 hours to 72 hours. A drying agent may be attached to the inside or to the outside of the bag B.

Subsequently, as illustrated in FIG. 2, the stack 3 is placed on the lower mold 10 such that the insertion post 12 is inserted into the shaft hole 3a of the stack 3. Next, the permanent magnets 4 are individually inserted into the magnet insertion holes 6. Next, the resin guide member 20 is placed on the upper surface of the stack 3 such that the insertion post 12 is inserted into the through hole 20a and each through hole 20b is in communication with the corresponding magnet insertion hole 6.

Next, the upper mold 30 is placed on the upper surface of the resin guide member 20 such that the insertion post 12 is inserted into the through hole 30a and each through hole 30b is in communication with the outside end portion of the corresponding runner groove 20c. The stack 3 is thus held between a pair of holding members including the lower mold 10, and the upper mold 30 placed on the resin guide member 20. In this state, the magnet insertion hole 6, the through hole 20b, the runner groove 20c, and the through hole 30b are in communication with each other.

Next, the heat-treated resin pellets P are taken out of the bag B and put into the through holes 30b. When the resin pellets P are melted by the internal heat source in the upper mold 30 (melting process), as illustrated in FIG. 3, the plungers 40 push out the melted resin from the through holes 30b, so that the melted resin is injected into the magnet insertion holes 6. The temperature of the internal heat source, for example, may be about 150° C. to 185° C. or may be about 170° C. to 180° C.

Subsequently, when the melted resin solidifies, the solidified resins 5 are formed in the magnet insertion holes 6. The lower mold 10, the resin guide member 20, and the upper mold 30 are removed from the stack 3, resulting in the stacked rotor core 2.

Referring to FIGS. 4A to 4D, the flow process of melted resin M in the through hole 20b is described in more detail. The melted resin M also flows through the sections other than the through holes 20b in the resin injection apparatus 1 and the flow process is similar to that described below.

Figures 4A, 4B:
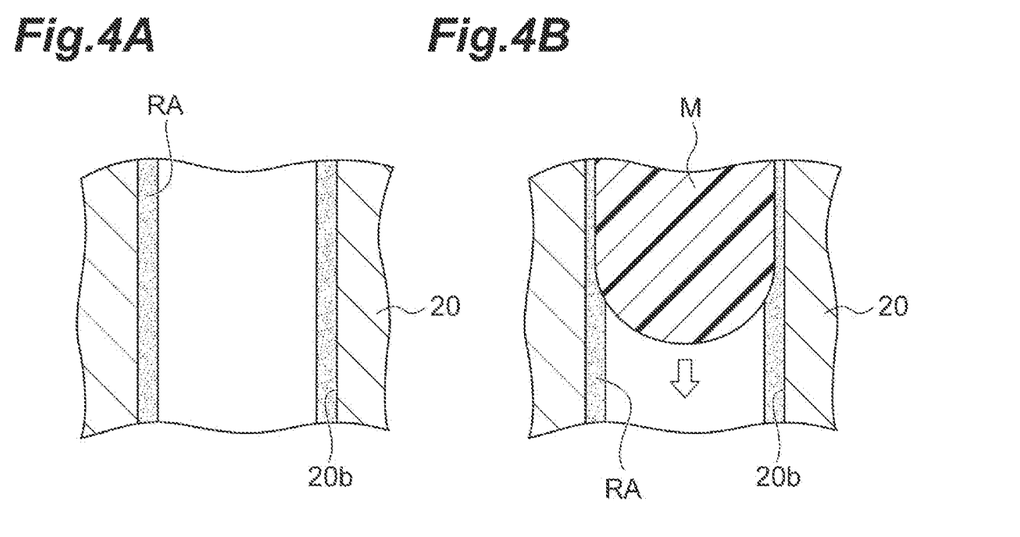
FIGS. 4A to 4D are cross-sectional views of a gate hole and the vicinity thereof in a resin guide member, for an example flow process of the melted resin.

As illustrated in FIG. 4A, a release agent RA or a coating agent with a high release property may be applied beforehand on the inner wall surface of the through hole 20b of the resin guide member 20. A release agent RA or a coating agent with a high release property may be applied beforehand similarly on the section through which the melted resin circulates in the resin injection apparatus 1.

Figures 4C, 4D:
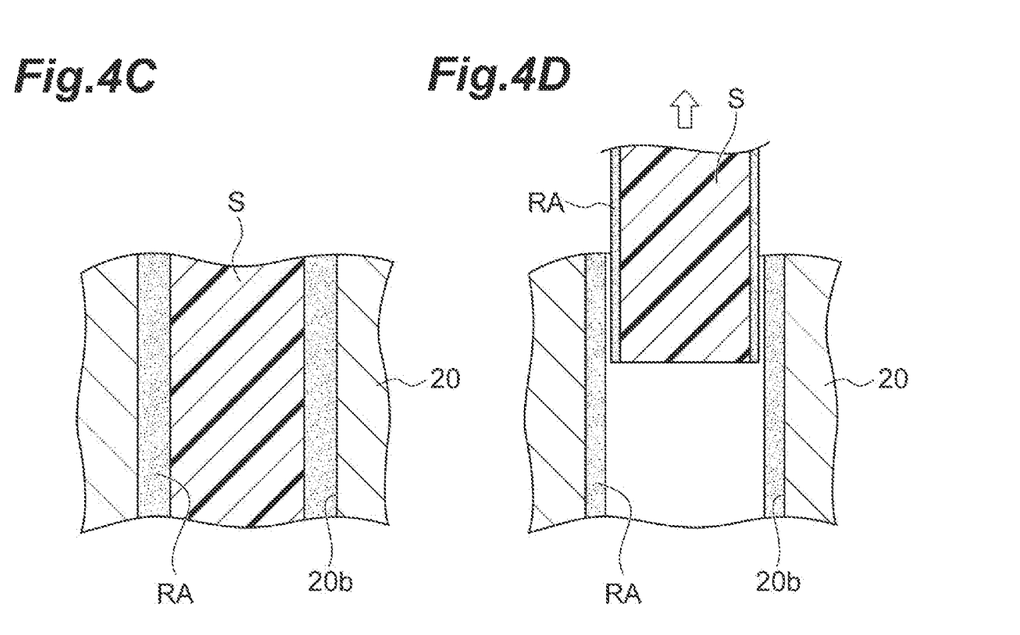

As illustrated in FIG. 4B, the melted resin M, which is the melted resin pellet P, flows in the through hole 20b while the melted resin M is lubricated with the release agent RA on the inner wall surface of the through hole 20b. Subsequently, heat applied from the internal heat source in the upper mold 30 acts on the curing agent included in the resin pellet P, so that a cross-linking reaction of the epoxy resin proceeds and the resin gradually cures. At this moment, as illustrated in FIG. 4C, the release agent included in the resin pellet P is expelled to the outer surface of the melted resin M and is supplied to the inner wall surface of the through hole 20b. This forms a release layer between the melted resin M and the inner wall surface of the through hole 20b. In this manner, since the resin pellet P subjected to predetermined heat treatment undergoes a cross-linking reaction of the epoxy resin in the preparation stage, the release agent included in the resin pellet P is preferentially expelled to the outside surface of the melted resin M.

When the melted resin M cures in the through hole 20b, the solidified resin S is formed in the through hole 20b. This solidified resin S may be called cull. As illustrated in FIG. 4D, the solidified resin S is pushed out of the through hole 20b using a remover such as a rod. In doing so, the solidified resin S is easily removed from the through hole 20b since the release agent is sufficiently expelled from the melted resin M onto the inner wall surface of the through hole 20b.

In some examples, a predetermined heat treatment is performed on the resin pellets P before the resin pellets P are melted and injected into the magnet insertion holes 6 of the stack 3. Therefore, compared with conventional heat treatment conditions, the melted resin pellets P achieve a degree of flowability (developing viscosity) extremely suitable for resin injection. The melted resin thus can be injected appropriately into the magnet insertion holes 6. In addition, compared with conventional heat treatment conditions, a cross-linking reaction of the epoxy resin forming the resin pellets P is easier to proceed. The release agent is therefore preferentially interposed between the melted resin M and the resin injection apparatus 1, so that the solidified resin S is easily removed and is less likely to be left in the resin injection apparatus 1. This facilitates maintenance of the resin injection apparatus 1 after injection of the melted resin M.

Resin pellets P having a desired developing viscosity may be obtained in a shorter time, for example by heat-treating the resin pellets P for a short time less than 48 hours at a temperature exceeding 32° C. However, since the cross-linking reaction proceeds even after completion of heat treatment, the developing viscosity is higher as there is a longer time before the resin pellets P are actually used after completion of heat treatment. In the manufacturing plant of stacked rotor cores 2, a plurality of bags B containing a large amount of resin pellets P are heat-treated at the same time, and the resin pellets P are taken out of the bags B and used little by little. Thus, the resin pellets P are often used after a certain time (for example, about one day) has passed since the heat treatment. For this reason, in general, the resin pellets P may be heat-treated over a time equal to or longer than 48 hours at a temperature equal to or lower than 32° C. However, in a situation in which the heat-treated resin pellets P can be used up in a short time after heat treatment, the resin pellets P may be heat-treated for a shorter time (equal to or longer than 24 hours) at a temperature exceeding 32° C.

In some examples, the resin pellets P may be heated at a temperature of 28° C. to 32° C. for 48 hours or longer. In this case, the developing viscosity of the melted resin, which is the melted resin pellets P, can be more suitable for injection of the melted resin into the magnet insertion holes 6.

In some examples, as a manner of heating the resin pellets P, the resin pellets P are left for a predetermined time in the heat treatment chamber 101 regulated to a predetermined temperature, thereby completing the heat treatment of the resin pellets P. The heat-treated resin pellets P thus can be obtained without additional effort.

In some examples, the bag B containing a plurality of resin pellets P is left in the heat treatment chamber 101. A plurality of heat-treated resin pellets P thus can be obtained at the same time.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

For example, a heat treating means other than the heat treatment apparatus 100 may be used to heat the resin pellets P to a certain temperature. The resin pellets P may be heated to a certain temperature by placing the resin pellets P or the bag B containing the resin pellets P on a hot plate kept at a certain temperature or by blowing hot air at a certain temperature to the resin pellets P or the bag containing the resin pellets P using a blower.

In some examples, the resin guide member 20 may be formed with a member having a shape other than a plate shape, that has a function of guiding the melted resin to the magnet insertion holes 6 (resin formation regions).

Additionally, the resin guide member 20 may be disposed between the lower mold 10 and the stack 3, and the melted resin may be injected from the lower mold 10 into the magnet insertion holes 6. The resin guide members 20 may be disposed between the lower mold 10 and the stack 3 and between the upper mold 30 and the stack 3, and the melted resin may be injected from the lower mold 10 and the upper mold 30 into the magnet insertion holes 6.

In some examples, the resin injection apparatus 1 may not include the resin guide member 20. In this case, resin channels equivalent to the through holes 20b and the runner grooves 20c may be directly formed in the lower mold 10 or the upper mold 30.

A heat treatment of the resin pellets P may be completed until the stack 3 is held between the lower mold 10, and the resin guide member 20 and the upper mold 30.

In some examples, after the stack 3 is attached to the lower mold 10, the permanent magnets 4 are inserted into the magnet insertion holes 6. In other examples, the stack 3 with the permanent magnets 4 inserted in the magnet insertion holes 6 may be attached to the lower mold 10.

A group of magnets including two or more permanent magnets 4 in combination may be inserted into one magnet insertion hole 6. For example, a plurality of permanent magnets 4 may be arranged in the longitudinal direction of one magnet insertion hole 6. Additionally, a plurality of permanent magnets 4 may be arranged in the height direction of the one magnet insertion hole 6. Still further, a first set of permanent magnets 4 may be arranged in the longitudinal direction of the one magnet insertion hole 6 and a second set of permanent magnets 4 may be arranged in the height direction of the one magnet insertion hole 6.

In some examples, the stack 3 formed by stacking a plurality of blanked members W functions as a core body to which the permanent magnets 4 are attached. In other examples, the core body may not be formed with the stack 3. For example, the core body may be formed by compacting ferromagnetic powder or may be formed by injection-molding a resin material containing ferromagnetic powder.

One or more of the methods, procedures, steps or operations described here may be applied not only to the stacked rotor core 2 but also to a stacked stator core.

Additionally, the resin formation region is not limited to the magnet insertion hole 6. For example, the resin formation region may be the surface of a slot of the stacked stator core. For example, a foundry core may be inserted in the slot, and the resin injection apparatus 1 may inject the melted resin into a space produced between the surface of the slot and the outer peripheral surface of the foundry core to form the solidified resin 5 on the surface of the slot.

When the blanked members W are bonded to each other using a resin material, for example, the melted resin may be charged into a joint hole (resin formation region) provided in the stack 3 so as to pass through in the height direction to bond the blanked members W adjacent in the height direction to each other. The method of bonding the blanked members W to each other may be a combination of bonding by swaged areas, bonding by an adhesive, and bonding by welding.

Additionally, the heating time or the heating temperature of the resin pellets P may be changed according to the size and the depth of the resin formation region. For example, when the magnet insertion hole 6 is relatively long (when the stack 3 is relatively tall) or when the gap between the magnet insertion hole 6 and the permanent magnet 4 inserted therein is relatively small, the resin pellet P may be heated at a relatively low temperature for a relatively short time to obtain a melted resin having a relatively low developing viscosity so that the melted resin is smoothly injected into the magnet insertion hole 6 and so as not to produce an unfilled region in the magnet insertion hole 6. Alternatively, for example, when the magnet insertion hole 6 is relatively short (when the stack 3 is relatively low) or when the gap between the magnet insertion hole 6 and the permanent magnet 4 inserted therein is relatively large, the resin pellet P may be heated at a relatively high temperature for a relatively long time to obtain a melted resin having a relatively high developing viscosity, in order to prevent leakage of the melted resin from the gap.

EXPERIMENTAL EXAMPLES

Additional examples, experimental examples, and comparative examples are described in further detail below.

Experimental Example 1

Filling Property

Resin pellets P of Experimental example 1 were formed of a resin containing 55% by weight to 65% by weight of silica, 10% by weight to 20% by weight of epoxy resin, and 5% by weight to 10%/o by weight of phenolic resin as main components. The developing viscosity of the resin pellets P was measured when the temperature and the heat treatment time of the heat treatment chamber 101 were changed. A "constant test force extrusion type, capillary rheometer, flowtester CFT-500EX" manufactured by SHIMADZU CORPORATION was used to measure the developing viscosity. The test was performed by a constant temperature method and the Hagen-Poiseuille law was used for the calculation. The test conditions were set such that the force was 230 kgf, the temperature was 175° C., the preheat time was 10 seconds, the die hole diameter was 1 mm, and the die length was 10 mm. Using the resin pellets P after heat treatment, a test was conducted in which the melted resin was charged into the magnet insertion holes 6 by the resin injection apparatus 1.

Figure 5:
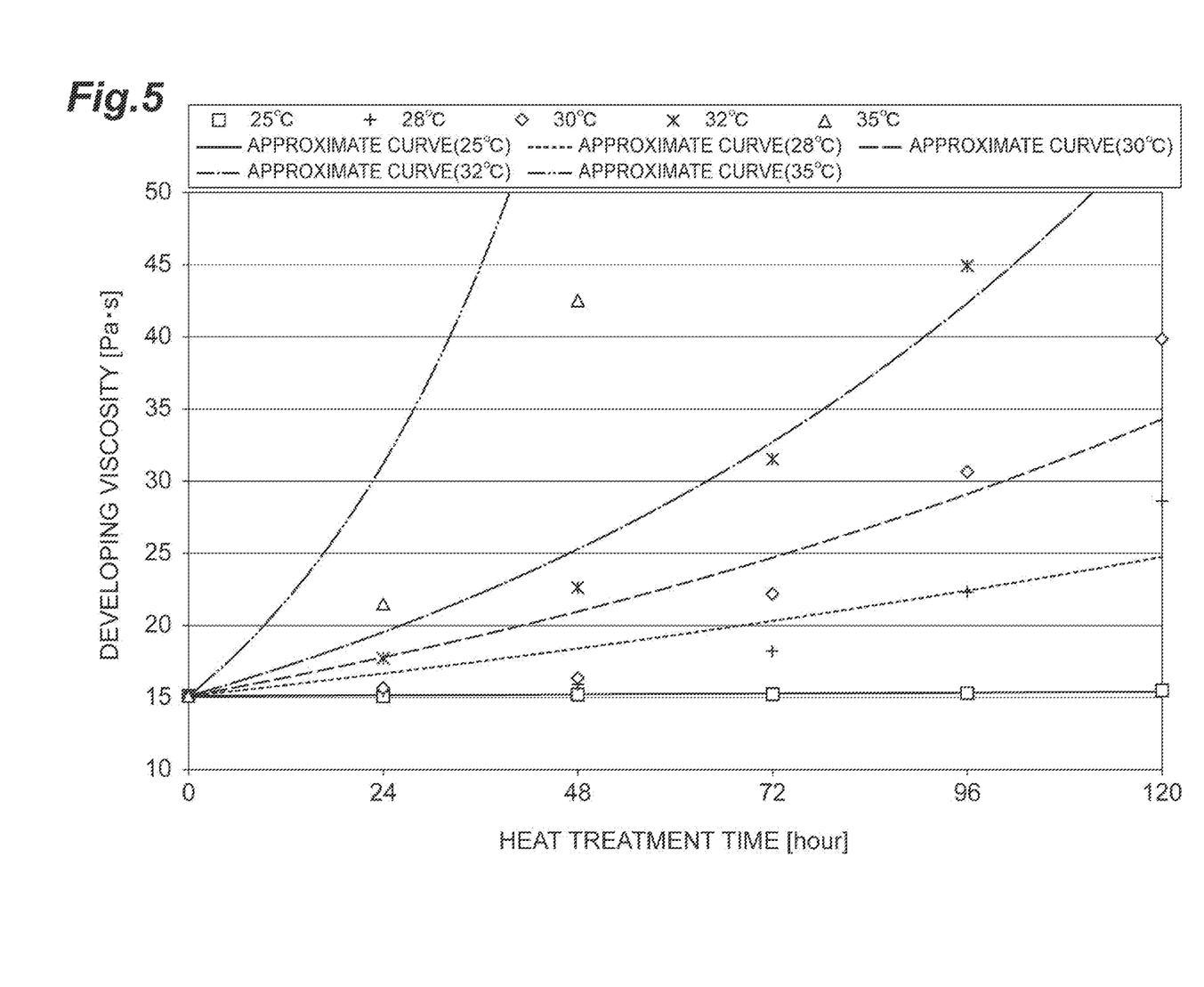
FIG. 5 is a graph illustrating an example change in developing viscosity of resin pellets when the temperature and the heat treatment time in a heat treatment chamber are changed.

The measurement results of developing viscosity are shown in Table 1 and FIG. 5. FIG. 5 is a graph in which data in Table 1 is plotted in the range of developing viscosity of 10 Pa·s to 50 Pa·s, where the horizontal axis shows heat treatment time and the vertical axis shows developing viscosity. The curves are approximate exponential curves, where the intercept is 15.1.

TABLE 1

| | | Temperature | | | | |
|---|---|---|---|---|---|---|
| | | 25° C. | 28° C. | 30° C. | 32° C. | 35° C. |
| heat treatment time | 0 hours | 15.1 | 15.1 | 15.1 | 15.1 | 15.1 |
| | 24 hours | 15.1 | 15.4 | 15.7 | 17.7 | 21.5 |
| | 48 hours | 15.2 | 15.9 | 16.3 | 22.6 | 42.5 |
| | 72 hours | 15.2 | 18.2 | 22.2 | 31.5 | 122.2 |
| | 96 hours | 15.3 | 22.3 | 30.6 | 44.9 | 277.8 |
| | 120 hours | 15.5 | 28.6 | 39.8 | 57.1 | 761.4 |

(developing viscosity in Pa · s)

As illustrated in Table 1 and FIG. 5, when the temperature was 35° C. and the heat treatment time was equal to or longer than 96 hours, the developing viscosity was too high to inject the melted resin into the magnet insertion holes 6. When the temperature was 35° C. and the heat treatment time was 72 hours, the developing viscosity was high but the melted resin was able to be injected into the magnet insertion holes 6. However, a resin unfilled region was produced in the magnet insertion hole 6. Under the other conditions listed in Table 1, the developing viscosity was appropriate, and the melted resin was able to be charged into the magnet insertion hole 6 without producing an unfilled region. Based on the above, it has been confirmed that when resin pellets P are heat-treated at temperatures equal to or lower than 32° C., the melted resin can be injected appropriately into the magnet insertion holes 6.

Ease of Maintenance

A test was conducted on the ease of maintenance of the resin injection apparatus 1. Specifically, melted resin was charged into the magnet insertion holes 6 using resin pellets P heat-treated under the conditions described below, and the labor required to remove the solidified resin S adhering to the plungers 40, the resin guide member 20, and the lower mold 10 was evaluated. The results are shown in Table 2 to Table 4.

TABLE 2

| | Plunger 40 | | |
|---|---|---|---|
| | Frequency of cleaning | Cleaning method | Removal time |
| Left at room temperature (25° C.) for 24 hours (without heat treatment) | Once half a day | Air blow after scraping off solidified resin S with block | About 3 minutes per resin injection apparatus 1 |
| Heat treatment time of 48 to 120 hours Heat treatment temperature of 28° C. to 32° C. | Once a day | Air blow only | About 1 minute per resin injection apparatus 1 |

TABLE 3

| | Resin guide member 20 | | |
|---|---|---|---|
| | Frequency of cleaning | Cleaning method | Removal time |
| Left at room temperature (25° C.) for 24 hours (without heat treatment) | Once half a day | Air blow after scraping off solidified resin S with block | About 2 minutes per resin guide member 20 |
| Heat treatment time of 48 to 120 hours Heat treatment temperature of 28° C. to 32° C. | Once a day | Air blow only | About 30 seconds per resin guide member 20 |

TABLE 4

| | Lower mold 10 | | |
|---|---|---|---|
| | Frequency of cleaning | Cleaning method | Removal time |
| Left at room temperature (25° C.) for 24 hours (without heat treatment) | Every three months | Scrub with brass brush | About 5 minutes per resin injection apparatus 1 |

TABLE 4-continued

| | Lower mold 10 | | |
|---|---|---|---|
| | Frequency of cleaning | Cleaning method | Removal time |
| Heat treatment time of 48 to 120 hours Heat treatment temperature of 28° C. to 32° C. | Every three months | Scrub with wire brush | About 3 minutes per resin injection apparatus 1 |

As illustrated in Table 2 to Table 4, when heat-treated resin pellets P were used, the frequency of cleaning was reduced by half in the plungers 40 and the resin guide member 20. Additionally, when heat-treated resin pellets P were used, all of the plungers 40, the resin guide member 20, and the lower mold 10 were able to be cleaned by a simple method, and the time taken to remove the solidified resin S was significantly reduced. Based on the above, it has been confirmed that when heat-treated resin pellets P are used, the maintenance of the resin injection apparatus 1 after injection of the melted resin M may be simplified.

Experimental Example 2

Filling Property

In Experimental example 2, the test conditions were the same as in Experimental example 1, except that resin pellets P were formed of a resin containing 70% by weight to 80% by weight of silica, 10% by weight to 20% by weight of epoxy resin, and 5% by weight to 10% by weight of phenolic resin as main components.

Figure 6:
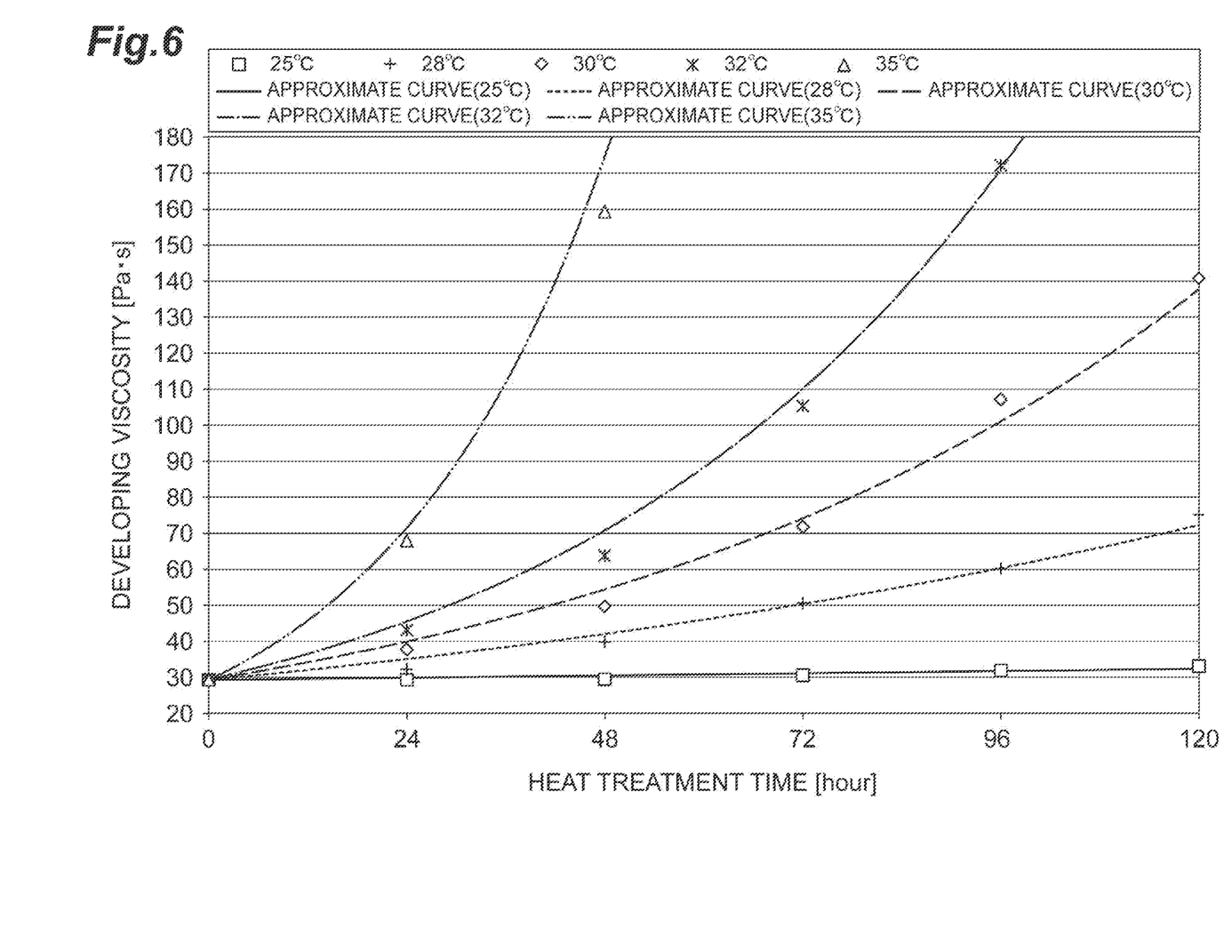
FIG. 6 is a graph illustrating another example change in developing viscosity of resin pellets when the temperature and the heat treatment time in a heat treatment chamber are changed.

The measurement results of developing viscosity are shown in Table 5 and FIG. 6. FIG. 6 is a graph in which data in Table 5 is plotted in the range of developing viscosity of 20 Pa·s to 180 Pa·s, where the horizontal axis shows heat treatment time and the vertical axis shows developing viscosity. The curves are approximate exponential curves, where the intercept is 29.31.

TABLE 5

| | | Temperature | | | | |
|---|---|---|---|---|---|---|
| | | 25° C. | 28° C. | 30° C. | 32° C. | 35° C. |
| heat treatment time | 0 hours | 29.3 | 29.3 | 29.3 | 29.3 | 29.3 |
| | 24 hours | 29.3 | 32.2 | 37.7 | 43.1 | 67.9 |
| | 48 hours | 29.5 | 39.8 | 49.7 | 63.7 | 159.2 |
| | 72 hours | 30.6 | 50.6 | 71.7 | 105.3 | 419.4 |
| | 96 hours | 31.9 | 60.2 | 107.2 | 172.1 | 1124.4 |
| | 120 hours | 33.1 | 75.1 | 140.8 | 287.4 | — |

(developing viscosity in Pa · s)

As illustrated in Table 5 and FIG. 6, when the temperature was 35° C. and the heat treatment time was 120 hours, the developing viscosity failed to be measured. When the temperature was 35° C. and the heat treatment time was 96 hours, the developing viscosity was too high to inject the melted resin into the magnet insertion holes 6. When the temperature was 35° C. and the heat treatment time was 72 hours, the developing viscosity was high but the melted resin was able to be injected into the magnet insertion holes 6. However, a resin unfilled region was produced in the magnet insertion hole 6. Under the other conditions, the developing viscosity was appropriate, and the melted resin was able to be charged into the magnet insertion holes 6 without producing an unfilled region. Based on the above, it has been confirmed that when resin pellets P are heat-treated at a temperature equal to or lower than 32° C., the melted resin can be injected appropriately into the magnet insertion holes 6.

Ease of Maintenance

A test was conducted on the ease of maintenance of the resin injection apparatus 1, in the same manner as in Experimental example 1. The results are similar to Experimental example 1. For example, it has been confirmed that when heat-treated resin pellets P are used, the maintenance of the resin injection apparatus 1 after injection of the melted resin M is simplified.

ADDITIONAL EXAMPLES

Resin pellets may be produced by forming a thermosetting resin composition including thermosetting resin, curing agent, accelerator, filler, release agent, and the like into a predetermined size and shape. Since a cross-linking reaction proceeds immediately after molding resin pellets, leaving the resin pellets as they are may affect the resin injection process. For example, the flowability (developing viscosity) of the melted resin may not be proper when the resin pellets are melted. In addition, an unfilled region may be produced in the resin formation region (for example, the magnet insertion hole), or the melted resin may leak out from, for example, the gap between the lower mold or the upper mold and the core body.

For this reason, the manufacturer of resin pellets packs resin pellets into bags after molding and ships the bags containing resin pellets in a refrigerator (cold container) kept at low temperatures (for example, about 4° C.) to customers. The manufacturer of resin pellets recommends using resin pellets as follows. That is, it is typically recommended that the purchaser should store the resin pellets at low temperatures before use and leave the resin pellets at room temperature for 24 hours in use so that the resin pellets exhibit appropriate flowability in a melted state. In the present description, "room temperature" means 23° C.±2° C. (according to ISO554:1976 23/50). Additionally, the viscosity of the resin pellets in a melted state is referred to as "developing viscosity" in the present description.

When the resin pellets left at room temperature for 24 hours are used as typically recommended by the manufacturer, the solidified resin may remain adhered to the surfaces of the plungers, the resin channels, the upper mold, or the lower mold in contact with the melted resin. This requires additional time and effort for maintenance of the resin injection apparatus for removing the resin residue. In some examples, the resin is less likely to be left in the resin injection apparatus by performing predetermined heat treatment on resin pellets before use.

An example method of manufacturing an core product may include heating the resin pellet, which was previously refrigerated, at a temperature higher than 25° C. for 24 hours or longer, the resin pellet being formed of a thermosetting resin composition including epoxy resin, curing agent, accelerator, and release agent. The method may include holding a core body having a resin formation region, which is a region in which a resin is to be formed by injection of a melted resin, between a pair of holding members, and disposing the heated resin pellet in a resin pot formed in at least one of the pair of holding members. Additionally, the method may include melting the resin pellet in the resin pot and injecting the melted resin into the resin formation region through a resin channel extending from the resin pot in communication with the resin formation region, and curing the melted resin injected into the resin formation region.

In some examples, a predetermined heat treatment is performed on the resin pellet before the resin pellet is heated into a melted state and injected into the resin formation region of the core body. Therefore, compared with conventional heat treatment conditions, the resin pellet melted attains a degree of the flowability (developing viscosity) extremely suitable for resin injection. The melted resin thus can be appropriately injected into the resin formation region. In addition, compared with conventional heat treatment conditions, a cross-linking reaction of the epoxy resin forming the resin pellet is easier to proceed. Subsequently, the melted resin is injected into the resin formation region of the core body and continuously heated (an elevated temperature is maintained). Then, the cross-linking reaction of the epoxy resin continues and the melted resin is gradually cured. In doing so, the release agent included in the melted resin is expelled to the outer surface to form a release layer. That is, since the resin pellet subjected to predetermined heat treatment undergoes a cross-linking reaction of the epoxy resin in the preparation stage, the release agent included in the resin pellet is easily expelled to the outer surface of the melted resin. The release agent is thus easily interposed between the resin and the resin injection apparatus, and the resin is less likely to be left in the resin injection apparatus. This facilitates maintenance of the resin injection apparatus after injection of the melted resin.

In some examples, heating the resin pellet may include heating the resin pellet at a temperature of 28° C. to 32° C. for 48 hours or longer. In this case, the developing viscosity of the melted resin, which is the melted resin pellet, can be more suitable for injection of the melted resin into the resin formation region.

In some examples, heating the resin pellet may include leaving the resin pellet in a heat treatment chamber regulated to a temperature higher than 25° C. for 24 hours or longer. In this case, the heat-treated resin pellet can be obtained without effort only by leaving the resin pellet in a heat treatment chamber for a predetermined time.

In some examples, heating the resin pellet may include taking out a bag containing a plurality of resin pellets from the refrigerator and heating the bag at a temperature higher than 25° C. for 24 hours or longer. A plurality of heat-treated resin pellets can be obtained at a time by heat-treating the bag.

We claim all modifications and variations coming within the spirit and scope of the subject matter claimed herein.

The invention claimed is:

1. A method of manufacturing a core product comprising:
    pre-heating a solid resin pellet, after being previously refrigerated, at a temperature of 28° C. to 32° C. for 24 hours to 120 hours, the solid resin pellet being formed of a thermosetting resin composition including an epoxy resin, a curing agent, an accelerator, and a release agent, wherein said pre-heating causes the solid resin pellet to undergo a cross-linking reaction of the epoxy resin without melting;
    holding a core body, having a resin formation region, between a pair of holding members;
    disposing the solid resin pellet, after being previously pre-heated at the temperature of 28° C. to 32° C., in a resin pot formed in at least one of the pair of holding members;
    melting the solid resin pellet in the resin pot at a temperature of 150° C. or higher to form a melted resin, wherein the release agent is preferentially expelled to an outside surface of the melted resin due, at least in part, to the cross-linking reaction of the epoxy resin that occurred during said pre-heating of the solid resin pellet at the temperature of 28° C. to 32° C.;

injecting the melted resin into the resin formation region through a resin channel extending from the resin pot in communication with the resin formation region; and curing the melted resin injected into the resin formation region to form a cured resin of the core product.

2. The method according to claim 1, wherein said pre-heating the solid resin pellet includes:

removing the solid resin pellet from a refrigerator; and leaving the solid resin pellet in a heat treatment chamber regulated to the temperature of 28° C. to 32° C. for 24 hours to 120 hours.

3. The method according to claim 1, wherein said pre-heating the solid resin pellet includes:

removing a bag containing a plurality of solid resin pellets from a refrigerator; and pre-heating the bag including the plurality of solid resin pellets at the temperature of 28° C. to 32° C. for 24 hours to 120 hours.

4. The method according to claim 1, wherein the pair of holding members includes a lower mold and an upper mold.

5. The method according to claim 4, wherein a resin guide member is interposed between the upper mold and the core body, and wherein the resin guide member is configured to guide the melted resin into the resin formation region, the resin formation region including a magnet insertion hole of the core body.

6. The method according to claim 5, wherein the resin guide member includes a plurality of resin channels, and a plurality of runner grooves.

7. The method according to claim 6, wherein each of the resin channels at least partially overlaps a corresponding magnet insertion hole of the core body.

8. The method according to claim 6, wherein the plurality of runner grooves extend along a surface of the resin guide member, and wherein each runner groove is in communication with a corresponding resin channel.

9. The method according to claim 4, wherein the lower mold or the upper mold is configured to guide the melted resin into the resin formation region, the resin formation region including a magnet insertion hole of the core body.

10. The method according to claim 9, wherein the lower mold or the upper mold includes a plurality of resin channels, and a plurality of runner grooves.

11. The method according to claim 10, wherein each of the resin channels at least partially overlaps a corresponding magnet insertion hole of the core body.

12. The method according to claim 10, wherein the plurality of runner grooves extend along a surface of the lower mold or the upper mold, and wherein each runner groove is in communication with a corresponding resin channel.

13. The method according to claim 1, wherein said curing the melted resin comprises solidifying the melted resin in the resin formation region to fix a permanent magnet that is inserted in a magnet insertion hole of the resin formation region.

14. The method according to claim 1, wherein a content of the epoxy resin is equal to or less than 20% by mass, a content of the curing agent is equal to or less than 10% by mass, a content of the accelerator is equal to or less than 1% by mass, and a content of the release agent is equal to or less than 1% by mass, with respect to 100% by mass of a total amount of the thermosetting resin composition.

15. The method according to claim 1, wherein the thermosetting resin composition contains 55% by weight to 65% by weight of silica, 10% by weight to 20% by weight of epoxy resin, and 5% by weight to 10% by weight of phenolic resin.

16. The method according to claim 1, wherein the thermosetting resin composition contains 70% by weight to 80% by weight of silica, 10% by weight to 20% by weight of epoxy resin, and 5% by weight to 10% by weight of phenolic resin.

17. A method of manufacturing a core product comprising: refrigerating a solid resin pellet;

pre-heating the solid resin pellet, after said refrigerating, at a temperature of 28° C. to 32° C. for 24 hours to 120 hours, the solid resin pellet being formed of a thermosetting resin composition including an epoxy resin, a curing agent, an accelerator, and a release agent, wherein said pre-heating causes the solid resin pellet to undergo a cross-linking reaction of the epoxy resin without melting;

melting the solid resin pellet, after said pre-heating, at a temperature of 150° C. or higher to form a melted resin, wherein the release agent is preferentially expelled to an outside surface of the melted resin due, at least in part, to the cross-linking reaction of the epoxy resin that occurred during said pre-heating of the solid resin pellet at the temperature of 28° C. to 32° C.;

injecting the melted resin into a resin formation region; and curing the melted resin in the resin formation region, after said injecting, to form a cured resin of the core product.

18. The method according to claim 17, wherein:

the resin formation region is located on a core body, the core body is held between two holding members, a resin pot is formed in at least one of the two holding members, and the melted resin is injected into the resin formation region through a resin channel extending from the resin pot.

19. The method according to claim 17, wherein said refrigerating comprises refrigerating the solid resin pellet at a temperature of about 4° C. or less before pre-heating the solid resin pellet at the temperature of 28° C. to 32° C.

* * * * *